United States Patent [19]

Stafford

[11] Patent Number: 4,915,557
[45] Date of Patent: Apr. 10, 1990

[54] CAPTIVE SCREW ASSEMBLY

[75] Inventor: Jay M. Stafford, Torrance, Calif.
[73] Assignee: Rexnord Holdings Inc., Torrance, Calif.
[21] Appl. No.: 243,882
[22] Filed: Sep. 13, 1988
[51] Int. Cl.⁴ ............................................. F16B 39/00
[52] U.S. Cl. .................... 411/107; 411/353; 411/82; 411/258; 292/251
[58] Field of Search .............. 411/107, 105, 353, 352, 411/82, 258, 257, 552, 103; 403/406.1; 292/251

[56] References Cited

U.S. PATENT DOCUMENTS

| | | | |
|---|---|---|---|
| 748,078 | 12/1903 | Kaisling | 292/251 |
| 1,609,772 | 12/1926 | Rank | 292/175 |
| 1,970,078 | 8/1934 | Dillon | 411/107 |
| 2,460,613 | 2/1949 | Whelan et al. | 292/251 |
| 2,640,245 | 6/1953 | Becker | 411/559 |
| 3,018,127 | 1/1962 | Dobrosielski | 292/251 |
| 3,343,581 | 9/1967 | Martin | 292/251 |
| 3,368,602 | 2/1968 | Boyd | 411/105 |
| 3,871,429 | 3/1975 | Bosse | 411/107 |
| 3,893,496 | 7/1975 | Wallace | 411/258 |
| 4,387,497 | 6/1983 | Gulistan | 411/105 |
| 4,408,940 | 10/1983 | Fischer | 411/258 |

OTHER PUBLICATIONS

"Captive Screws", Tridair Fasteners, Catalog No. 900 C, 1986.

Primary Examiner—Gary L. Smith
Assistant Examiner—F. Saether
Attorney, Agent, or Firm—Pretty, Schroeder, Brueggemann & Clark

[57] ABSTRACT

A captive screw assembly for impeding the removal of a screw from a housing or other part. The assembly includes a housing having a hole and an annular flange projecting inwardly in the hole at a location spaced from the hole's two ends. A screw encircled by a coil spring extends through the housing hole with the spring being retained between the screw head and the inwardly-projecting flange. A stopnut, which is sized to be freely received in the housing hole, is threaded to a selected location on the screw. The screw is urged longitudinally upwardly from the housing by the coil spring, to a point where the stopnut abuts against the inwardly-projecting flange. A full removal of the screw from the housing is thereby impeded.

13 Claims, 1 Drawing Sheet

U.S. Patent      Apr. 10, 1990      4,915,557
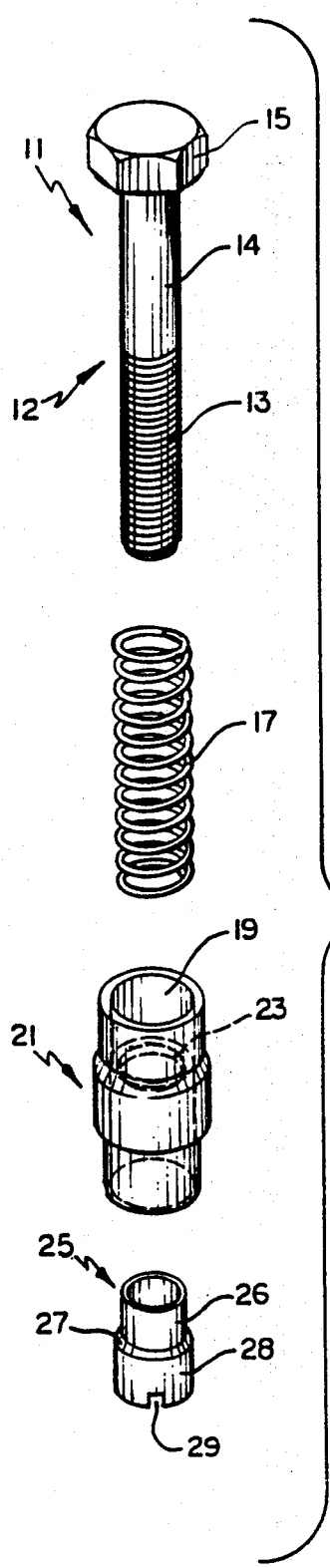
FIG 1
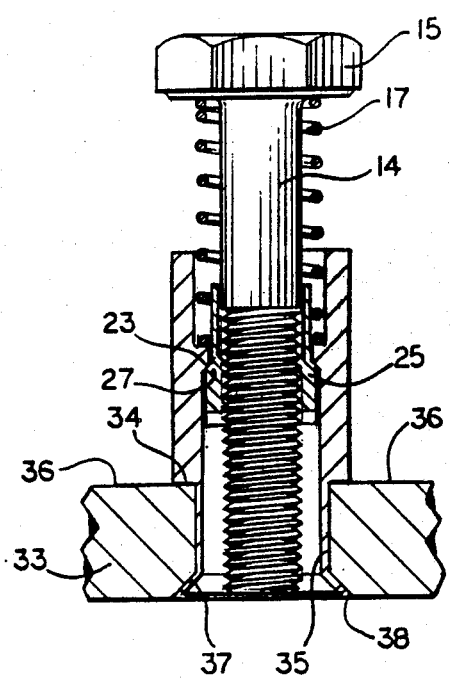
FIG 2
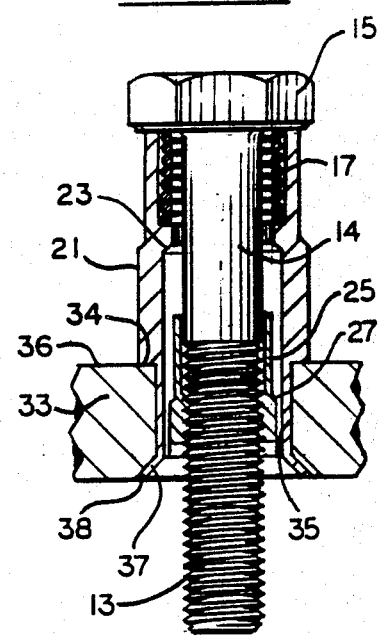
FIG 3
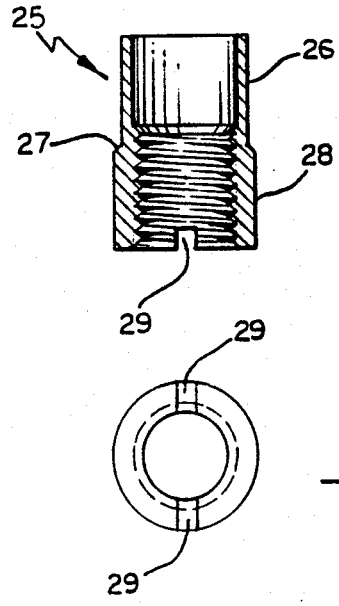
FIG 4
FIG 5

CAPTIVE SCREW ASSEMBLY

BACKGROUND OF THE INVENTION

This invention relates generally to screw fasteners, and, more particularly, to screw fasteners assemblies of the kind that captivate a screw in a housing.

Captive screw assemblies of this particular kind have been in common use for preventing the full removal of screws from the housings or other parts in which the screws are contained. These assemblies typically call for using reduced shank diameter blanks or screws without threads, which are installed in holes formed in the appropriate housing. The blank is then captivated within the housing by thread-rolling threads on the blank, such that the major diameter of the threads is larger than the diameter of the housing hole in which the blank is placed. These captive screw assemblies are sometimes provided with a coil spring encircling the screw shaft. The spring is compressed when the screw is rotated in one direction and thus urges the screw head outwardly.

Captive screw assemblies of the type briefly described above, although generally effective, are not entirely satisfactory. The threads on the screw can only be rolled after the screw has been placed in the hole of the housing. This increases the cost of captive screw assemblies, because standard prethreaded screws cannot be used and because additional machinery and effort are ordinarily required to thread the blanks after they have been installed in the housing hole. Furthermore, reduced shank diameter blanks, which are later thread-rolled, are generally not as strong as prethreaded, full shank diameter screws made of the same material. In addition, such thread-rolled screws cannot readily be removed from the housing and replaced with another screw, if the need should ever arise.

It should, therefore, be appreciated that there is a need for a captive screw assembly which overcomes the above problems. The assembly should ideally utilize a conventional, prethreaded screw for strength and cost efficiency. The present invention provides the necessary solution.

SUMMARY OF THE INVENTION

The present invention is embodied in a captive screw assembly for impeding the removal of conventional, prethreaded screws from housings or other parts so that the screws will not become easily lost or misplaced when the parts that are joined together are separated. The captive screw assembly of the invention includes a housing having a hole sized to receive the screw and further having an annular flange projecting inwardly in the hole at an intermediate position, spaced from the ends of the hole. The screw has a head at one end and a shaft, at least a portion of which is threaded. A coil spring encircles the screw shaft, and the screw shaft and spring are placed inside the hole in the housing. The inner diameter of the annular flange in the hole is larger than the major diameter of the screw but smaller than the diameter of the spring encircling the screw. This allows the screw to extend through the hole in the housing but retains the spring between the head of the screw and an upper side of the inwardly-projecting flange. A stopnut is then threaded to a selected location on the screw shaft. The outer diameter of the stopnut is smaller than the diameter of the hole in the housing but larger than the inner diameter of the annular flange in the housing. This allows the stopnut to be freely received in the hole but retained against a lower side of the annular flange. With the stopnut threaded on the screw, the coil spring will urge the screw head longitudinally outwardly from the housing hole until an annular shoulder on the stopnut abuts against the lower side of the annular flange, thereby impeding the removal of the screw from the housing. The diameters of the portions of the hole above and below the annular flange need not be identical.

In a more detailed feature of the invention, an adhesive can be applied to the threads of the stopnut, to prevent it from loosening after it has been selectively positioned on the threads of the screw. To further prevent the stopnut from loosening, the abutting housing flange and stopnut shoulder have low friction surfaces so that they can easily slide against each other when the screw is turned. The stopnut is also provided with notches or slots on its end facing away from the screw head, to enable it to mate with the pins or blades of a tool for threading the stopnut on the screw. In another feature of the invention, the stopnut has a forward end of a reduced outer diameter, such that the annular shoulder which abuts the annular flange is in a mid-portion of the stopnut.

In yet another feature of the invention, the captive screw assembly is installed in a hole formed in a panel. A shoulder on the outer surface of the housing abuts against one surface of the panel, and a swaged end of the housing is flared outwardly against another surface of the panel, to secure the housing in place.

Other aspects and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 1 is an exploded perspective view of a captive screw assembly embodying the invention.

FIG. 2 is a cross-sectional view of the captive screw assembly of FIG. 1, showing a stopnut abutted against an annular flange in a housing to impede the full removal of the screw from the housing.

FIG. 3 is a cross-sectional view of the captive screw assembly of FIG. 1, with the screw being shown as if it were threaded into another part (not shown), thereby compress the spring.

FIG. 4 is a cross-sectional view of the stopnut.

FIG. 5 is a bottom plan view of the stopnut.

DESCRIPTION OF THE PREFERRED EMBODIMENT

With reference now to the illustrative drawings, and particularly to FIGS. 1-3, there is shown an embodiment of a captive screw assembly for use in impeding the removal of a screw from a part or housing so that the screw will not be lost or misplaced. The captive screw assembly includes a screw 11 having a shaft 12 with a threaded section 13 and a shank section 14 and further having a head 15. A coil spring 17 encircles the screw shaft, as best depicted in FIG. 2. The screw extends through a hole 19 formed in a generally tubular housing 21. The housing has an annular flange 23 projecting inwardly from an intermediate location in the hole. The inner diameter of the flange is larger than the diameter of the screw but smaller than the diameter of the spring. This configuration allows the spring to be retained between the screw head and the annular flange (see FIGS. 2 and 3), while permitting the screw to extend completely through the housing.

The diameter of the hole 19 formed in the housing 21 need not be the same on opposite sides of the inwardly-projecting flange 23. For example, with reference to FIGS. 2 and 3, the hole's diameter above the flange, i.e., on the side carrying the spring 17, is shown to be greater than the hole's diameter below the flange. In some cases the reverse may be required.

Threaded onto the threaded section 14 of the screw 11 is a stopnut 25 having a forward end 26 with a cylindrical outer surface of diameter less than the inner diameter of the housing's inwardly-projecting flange 23 and further having a rearward end 28 with a cylindrical outer surface of a diameter less than the diameter of the housing's hole 19, but greater than the inner diameter of the flange. An annular shoulder 27 separates the forward end and rearward ends and faces the screw head 15. Thus, the stopnut is sized to be freely received in the housing's, but is sufficiently large that the stopnut's annular shoulder will abut against the housing's inwardly-projecting flange.

In previous captive screw assemblies, screws typically were captivated in holes formed in housings or other parts by thread-rolling reduced shank diameter blanks after they had been installed in the holes. This proved to be costly, since standard prethreaded screws could not be used and additional machinery and effort were needed to thread the blanks. Also, the strength of these type captive screws was generally reduced since blanks having reduced shank diameters were required.

In the captive screw assembly of the present invention, on the other hand, the use of the stopnut 25 and the housing's inwardly-projecting flange 23 effectively allow full shank diameter, prethreaded screws to be used. After the stopnut 25 is threaded on the screw 11, the coil spring 17 urges the screw longitudinally outwardly from the housing's hole 19 until the stopnut's annular shoulder 27 abuts against the housing's inwardly-projecting flange, thereby impeding full removal of the screw from the housing. The stopnut can be selectively positioned anywhere on the screw's threaded shaft 13, to control the distance which the spring can urge the screw to withdraw from the housing.

Furthermore, an adhesive (not shown in the drawings), such as Loctite, may be applied to the threads of the stopnut 25, to inhibit it from loosening after it is selectively positioned on the screw 11. Even with the application of an adhesive to the stopnut, the stopnut still can be selectively removed from the screw and the stopnut and/or screw replaced with substitutes, if the need ever arises. To further inhibit the stopnut 25 from loosening, the stopnut's shoulder 27 and the housing's flange 23 are provided with low-friction surfaces which abut each other so that they will easily slide relative to each other when the screw 11 is turned.

As best shown in FIGS. 1, 4 and 5, notches 29 are located on the end of the stopnut 25 facing away from the screw head 15 so that a tool with pins or blades can mate with the stopnut in order to thread it on the screw while the screw is located within the hole 19 formed in the housing 21.

The captive screw assembly is intended for installation into a panel 33 (FIGS. 2 and 3) having a hole 35 which is sized to receive the tubular housing 21. An annular shoulder 34 of the housing abuts against the portion of an upper surface 36 of the panel surrounding the panel hole, and a swaged end 37 of the housing flares radially outwardly to abut against the portion of the lower surface 38 of the panel, to secure the housing in place.

It should be appreciated from the foregoing description that the present invention provides an improved captive screw assembly for impeding the removal of a conventional full shank diameter, prethreaded screw from a housing. A stopnut is threaded to a selected location on the screw after the screw has been installed through a hole in the housing. The stopnut abuts against an annular flange projecting inwardly in the housing's hole from a location spaced from the hole's opposite ends, thereby impeding full removal of the screw.

Although the present invention has been described in detail with reference only to the presently preferred embodiment, it will be appreciated by those of ordinary skill in the art that various modifications can be made without departing from the invention. Accordingly, the invention is limited only by the following claims.

I claim:

1. A captive screw assembly, comprising:
   a screw having a head at one end and an adjacent shaft having an upper unthreaded shank and a lower threaded section, with the diameter of the upper unthreaded shank section being substantially the same as the maximum thread diameter of the lower threaded section;
   a housing having a hole with two ends and sized to receive the screw shaft, the housing including an annular flange projecting inwardly in the hole at a location spaced from the hole's two ends; and
   a one-piece stopnut threaded to a selected position on the lower threaded section of the screw shaft, the stopnut having a forward end disposed nearest the screw head, a rearward end disposed furthest from the screw head, and an annular flange located between the forward end and the rearward end and facing the screw head, wherein the forward end has an outer diameter less than the inner diameter of the inwardly-projecting flange, and wherein the rearward end has an outer diameter less than the inner diameter of the hole in the housing but greater than the inner diameter of the inwardly-projecting flange, to allow a limited retraction of the screw from the housing, to a selected position where the annular shoulder engages the inwardly-projecting flange.

2. A captive screw assembly of claim 1, further comprising a coil spring encircling at least a portion of the screw shaft adjacent to the screw head.

3. A captive screw assembly of claim 1, wherein:
   the assembly further comprises an adhesive material applied to the threads of the stopnut, to prevent the stopnut from threadedly moving relative to the screw when the stopnut has been selectively positioned on the screw, thereby controlling the distance by which the screw can be withdrawn from the housing; and
   the abutting surfaces on the annular shoulder of the stopnut and the inwardly-projecting flange of the housing are smooth and have sufficiently low friction to ensure that when the surfaces abut they will slide relative to each other, to inhibit the stopnut from threadedly moving relative to the screw when the screw is rotated.

4. A captive screw assembly of claim 1, wherein:

the stopnut further includes notches on its end facing away from the screw head, such that the stopnut can be selectively threaded or unthreaded on the screw shaft using a tool having pins or blades.

5. A captive screw assembly, comprising:
   a screw having a head at one end and an adjacent shaft, at least a portion of which is threaded;
   a coil spring encircling at least a portion of the screw shaft adjacent to the screw head;
   a housing having a hole with two ends and sized to receive the spring and the screw shaft, the housing including an annular flange projecting inwardly in the hole at a location spaced from the hole's two ends, the inwardly-projecting flange having an inner diameter less than the diameter of the spring but greater than the outer diameter of the screw shaft, such that the spring is confined between the screw head and the flange; and
   a stopnut threaded to a selected position on the threaded portion of the screw shaft, the stopnut having an annular shoulder facing the head end of the screw, and the stopnut having an outer diameter less than the inner diameter of the hole in the housing but greater than the inner diameter of the inwardly-projecting flange, wherein the stopnut further includes an integral forward end disposed closer to the screw head than is the stopnut shoulder and having a smaller diameter than the shoulder, such that the stopnut shoulder is in a mid-portion of the stopnut, and wherein the spring urges the screw head longitudinally away from the flange, to a point where the annular shoulder of the stopnut engages the flange, thereby impeding full removal of the screw from the housing.

6. A captive screw assembly of claim 5, wherein the housing includes an annular outer surface, concentric with the hole.

7. A captive screw assembly of claim 5, further comprising an adhesive material applied to the threads of the stopnut, to inhibit the stopnut from threadedly moving relative to the screw when the stopnut has been selectively positioned on the screw, thereby controlling the distance by which the spring can longitudinally urge the screw to withdraw from the housing.

8. A captive screw assembly of claim 7, wherein the abutting surfaces on the annular shoulder of the stopnut and the inwardly-projecting flange of the housing are smooth and have sufficiently low friction to ensure that when the surfaces abut they will slide relative to each other, to inhibit the stopnut from threadedly moving relative to the screw when the screw is further turned.

9. A captive screw assembly of claim 5, wherein the stopnut further includes notches on its end facing away from the screw head, such that the stopnut can be selectively threaded or unthreaded on the screw shaft using a tool having pins or blades.

10. A captive screw assembly of claim 5, wherein:
    the assembly is adapted to be installed into a panel having an upper surface and a lower surface and a hole sized to receive the housing; and
    the housing includes an annular shoulder for abutting against the portion of the upper surface of the panel surrounding the hole, and further includes a swaged end portion flared radially outwardly to engage the portion of the lower surface of the panel surrounding the hole, thereby securing the housing in the panel hole.

11. A captive screw assembly of claim 5, wherein:
    the screw shaft includes an upper unthreaded shank and a lower threaded section; and
    the diameter of the upper unthreaded shank is substantially the same as the maximum thread diameter of the lower threaded section.

12. A captive screw assembly of claim 5, wherein the hole in the housing has a circular cross-section, with a uniform diameter on the side of the inwardly-projecting flange nearest the screw head that is greater than the hole's uniform diameter on the opposite side of the flange.

13. A captive screw assembly, comprising:
    a screw having a head at one end and an adjacent shaft having an upper unthreaded shank and a lower threaded section, with the diameter of the upper unthreaded shank being substantially the same as the maximum thread diameter of the lower, threaded section;
    a coil spring encircling at least a portion of the screw shaft adjacent to the screw head;
    a housing having a hole having two ends and sized to receive the spring and the screw shaft, the housing having an annular outer surface, concentric with the hole, the housing including an annular flange projecting inwardly in the hole at a location spaced from the hole's two ends, the inwardly-projecting flange having an inner diameter less than the diameter of the spring but greater than the outer diameter of the screw shaft, such that the spring is confined between the screw head and the flange;
    a stopnut threaded to a selected position on the threaded section of the screw shaft, the stopnut having an annular shoulder facing the head end of the screw, and the stopnut including an integral forward end disposed closer to the screw head than is the annular shoulder and having a smaller diameter than the annular shoulder, such that the annular shoulder is in a mid-portion of the stopnut, the annular shoulder having an outer diameter less than the inner diameter of the hole in the housing but greater than the inner diameter of the inwardly-projecting flange of the housing; wherein the spring urges the screw head longitudinally away from the inwardly-projecting flange to a point where the annular shoulder of the stopnut engages the flange of the housing, thereby impeding full removal of the screw from the housing; and
    an adhesive material applied to the threads of the stopnut, to inhibit the stopnut from threadedly moving relative to the screw when the stopnut has been selectively positioned on the screw, thereby controlling the distance by which the spring can longitudinally urge the screw to withdraw from the housing;
    wherein the stopnut includes notches on its end facing away from the screw head, such that the stopnut can be selectively threaded or unthreaded on the screw shaft using a tool having pins or blades;
    wherein the abutting surfaces of the annular
    wherein the abutting surfaces of the annular shoulder of the stopnut and the inwardly-projecting flange of the housing have sufficiently low friction that the surfaces will slide relative to each other, to inhibit the stopnut from threadedly moving relative to the screw when the screw is further turned; and wherein the assembly is adapted for installation in a panel having an upper surface and a lower surface and a hole sized to receive the housing;
and wherein the housing includes an annular shoulder for abutting against the portion of the upper surface of the panel surrounding the panel hole, and further includes a swaged end portion flared radially outwardly to engage the portion of the lower surface of the panel surrounding the panel hole, thereby securing the housing in the panel hole.

* * * * *